US010332646B2

(12) United States Patent
Piefer et al.

(10) Patent No.: US 10,332,646 B2
(45) Date of Patent: Jun. 25, 2019

(54) APPARATUS AND METHOD FOR GENERATING MEDICAL ISOTOPES

(75) Inventors: Gregory Richard Piefer, Middleton, WI (US); Thad Alexander Heltemes, Waunakee, WI (US); Eric Nicholas Van Abel, Oregon, WI (US); Ross Francis Radel, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1285 days.

(21) Appl. No.: 13/373,899

(22) Filed: Dec. 5, 2011

(65) Prior Publication Data

US 2013/0142296 A1    Jun. 6, 2013

(51) Int. Cl.

| | |
|---|---|
| *G21G 1/06* | (2006.01) |
| *G21K 5/08* | (2006.01) |
| *H05H 6/00* | (2006.01) |
| *G21G 1/00* | (2006.01) |
| *G21G 1/10* | (2006.01) |

(Continued)

(52) U.S. Cl.
CPC .............. *G21G 1/06* (2013.01); *G21K 5/08* (2013.01); *H05H 6/00* (2013.01); *G21G 1/08* (2013.01); *G21G 1/10* (2013.01); *G21G 2001/0036* (2013.01); *G21G 2001/0042* (2013.01); *G21G 2001/0063* (2013.01);

(Continued)

(58) Field of Classification Search
CPC .. G21G 1/08; G21G 1/10; G21G 1/00; G21G 2001/0036; G21G 2001/0042; G21G 2001/06; G21G 2001/10; G21G 4/02; H05H 3/06; H05H 3/00; H05H 6/00; G21C 1/24; G21C 1/26; G21C 1/28; G21C 1/30; G21K 5/00; G21K 5/08

USPC ....... 376/108, 144, 158, 190, 194, 196, 199, 376/202, 114, 189, 186, 311, 313, 358; 250/390.04
See application file for complete search history.

(56) References Cited

U.S. PATENT DOCUMENTS

| | | | | |
|---|---|---|---|---|
| 2,815,321 | A * | 12/1957 | Wigner | G21C 1/22 |
| | | | | 376/177 |
| 2,840,522 | A * | 6/1958 | Young et al. | 376/219 |
| 3,693,367 | A * | 9/1972 | Di Peri | 62/45.1 |

(Continued)

FOREIGN PATENT DOCUMENTS

| | | |
|---|---|---|
| CN | 1992095 A | 7/2007 |
| CN | 101325092 A | 12/2008 |

(Continued)

OTHER PUBLICATIONS

OCDE/NEA Expert Group on Criticality Accident Analysis Silene Pulsed Experiments, Silene-Heu-Sol-Step, S10300/S2-300/S3-300, Commisariat A L'Energie Atomique, Direction Des Applications Militaires, Department de Recherche Sur Les Materiaux Nucleaires, Service en Neutronique et Criticite, Siege, France.

(Continued)

*Primary Examiner* — Sharon M Davis

(74) *Attorney, Agent, or Firm* — Boyle Fredrickson S.C.

(57) ABSTRACT

An apparatus for generating medical isotopes provides an annular fissile solution vessel surrounding a neutron generator. The annular fissile solution vessel provides for good capture of the emitted neutrons and a geometry that provides enhanced stability in an aqueous reactor. A neutron multiplier and/or a neutron moderator may be used to improve the efficiency and control the criticality of the reaction in the annular fissile solution vessel.

20 Claims, 5 Drawing Sheets

(51) Int. Cl.
*H05H 3/06* (2006.01)
*G21G 1/08* (2006.01)

(52) U.S. Cl.
CPC ....... *G21G 2001/0068* (2013.01); *H05H 3/06* (2013.01); *H05H 2277/116* (2013.01)

(56) References Cited

U.S. PATENT DOCUMENTS

| | | | | |
|---|---|---|---|---|
| 5,910,971 | A * | 6/1999 | Ponomarev-Stepnoy | ............... G21G 1/02 376/186 |
| 6,907,106 | B1 * | 6/2005 | McIntyre | ............. G21G 4/08 376/157 |
| 2003/0152187 | A1 | 8/2003 | Ritter | |
| 2007/0133731 | A1 * | 6/2007 | Fawcett et al. | ............... 376/202 |
| 2008/0258076 | A1 | 10/2008 | O'Hara et al. | |
| 2009/0225923 | A1 | 9/2009 | Neeley et al. | |
| 2009/0274258 | A1 * | 11/2009 | Holden | .............. G21G 1/10 376/190 |
| 2010/0284502 | A1 | 11/2010 | Piefer | |
| 2011/0096887 | A1 * | 4/2011 | Piefer | ............... 376/193 |
| 2011/0129049 | A1 | 6/2011 | Schenter | |
| 2011/0280356 | A1 * | 11/2011 | Tsang | ............. G21G 1/08 376/189 |

FOREIGN PATENT DOCUMENTS

| | | |
|---|---|---|
| CN | 101685680 A | 3/2010 |
| CN | 102113059 A | 6/2011 |
| WO | 2008063693 A2 | 5/2008 |
| WO | 2009135163 A2 | 5/2009 |

OTHER PUBLICATIONS

Chinese Search Report, Patent Application No. 201280067363.6, Filing Date Nov. 21, 2012.
Japanese Office Action of JP Patent Application No. 2014-545927 with English Translation; dated Sep. 27, 2016.

* cited by examiner

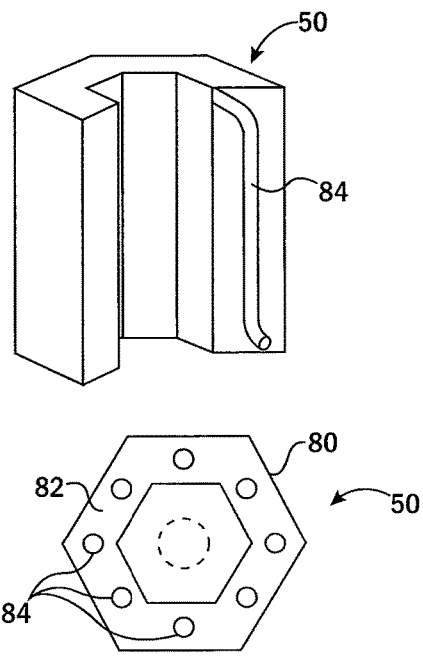
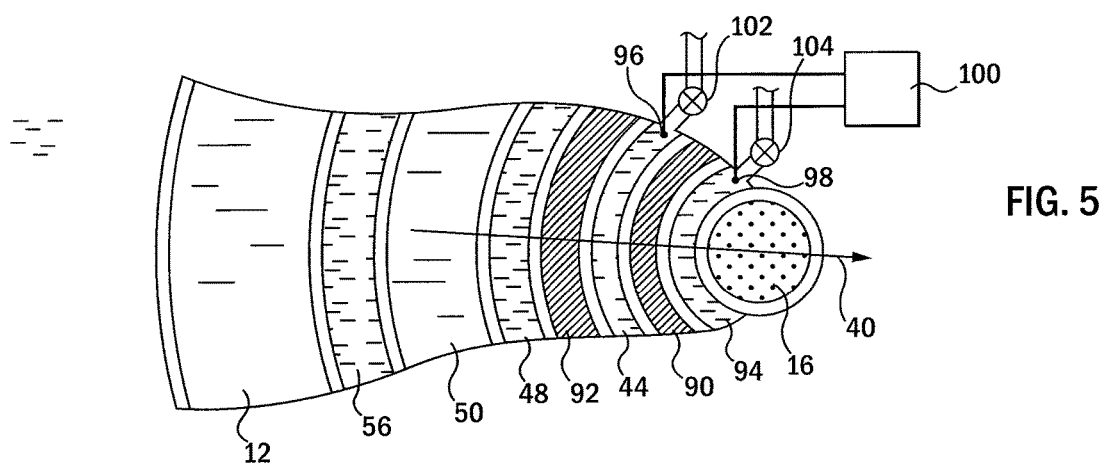

APPARATUS AND METHOD FOR GENERATING MEDICAL ISOTOPES

STATEMENT REGARDING FEDERALLY SPONSORED RESEARCH OR DEVELOPMENT

This invention was made with government support under DE-NA-00007520 awarded by the US Department of Energy. The government has certain rights in the invention.

CROSS REFERENCE TO RELATED APPLICATION

- - -

BACKGROUND OF THE INVENTION

The present invention relates to a system for generating isotopes useful for medical purposes, such as Mo-99, I-131, Xe-133, Y-90, Cs-137, I-125, and others and in particular to a system employing an annular aqueous fissile solution vessel.

Medical isotopes are employed in nuclear medicine where they may be administered to a patient in a form that localizes to specific organs or cellular: receptors where they may be imaged with special equipment. Medical isotopes may also be used in the treatment of disease i exploiting the tissue-destructive power of short-range ionizing radiation after such localization.

Today, most radioisotopes used in nuclear medicine are produced in nuclear reactors employing highly enriched uranium (HEU). The reactors used for the production of Mo-99 for the United States are outside of the United States requiring the export of HEU and an attendant risk of nuclear proliferation associated with such out-of-country shipments.

It has been proposed to generate medical isotopes using low enriched uranium (LEU) which cannot be used directly to manufacture nuclear weapons. Systems for this purpose are described in US patent applications: 2011/0096887 entitled: "Device and Method for Producing Medical Isotopes" and 2010/0284502 entitled: "High Energy Proton or Neutron Source" hereby incorporated by reference.

In these systems, ions are directed through a target volume holding a gas to generate neutrons. The neutrons may expose a parent material held in solution near the target volume in a fissile solution vessel. In one embodiment the target volume is annular and placed around a cylindrical fissile solution vessel holding the parent material solution. Ions are injected in a spiral through the target volume producing neutrons directed inwardly toward the parent material and outwardly toward a reflector.

Neutrons received in the neutron rich parent material (such as LEU uranium) experience a multiplication in which neutrons striking the parent material generate additional neutrons which strike additional neutron rich material in a chain reaction. In a nuclear reactor, at steady power, the effective neutron multiplication factor ($k_{eff}$) is equal to 1. In a subcritical system, $k_{eff}$ is less than 1.

One problem with aqueous reactors is that it can be difficult to maintain a stable power level. This is because there exists strong feedback mechanisms in the neutron multiplication factor as the temperature of the fissile solution rises and as voids are generated (gas bubbles caused by radiolysis breaking water into hydrogen and oxygen). The rapid reduction in the neutron multiplication factor results in a decrease power, which causes the neutron multiplication factor to increase again. In particular, a control system that is trying to maintain constant power in the reactor may not be able to react sufficiently fast to adequately control the system. The result is a system with an unstable power level and potential safety impacts.

SUMMARY OF THE INVENTION

The present invention provides an improved geometry for a fissile solution vessel used to generate medical isotopes. Specifically, the fissile solution vessel is a limited thickness annulus holding an aqueous suspension of a parent material. By controlling the aspect ratio of the annulus, improved reaction stability may be obtained over a conventional cylindrical chamber. In addition, enhanced cooling is possible by employing a cooling jacket on the inner wall of the annular solution vessel.

Specifically then, one embodiment of the present invention provides a nuclear reaction system having an annular solution vessel for holding an aqueous suspension of nuclear material having an inner wall defining a central opening extending along an axis. A first and second cooling jacket are in thermal communication with the inner wall of the annular solution vessel and an opposed outer wall of the annular solution vessel.

It is thus an object of at least one embodiment of the invention to provide improved stability to a reaction vessel by increasing the heat transfer area to volume through the use of an annular configuration.

The annular reaction container may contain low enriched uranium.

It is thus a feature of at least one embodiment of the invention to provide an apparatus for producing medical isotopes without the risks attendant to handling HEU.

The annular solution vessel may contain a mixture of water and at least one of uranyl nitrate, uranyl sulfate, uranyl fluoride or uranyl phosphate.

It is thus a feature of at least one embodiment of the invention to provide a system that may use a variety of different fissile solutions.

The nuclear reaction system may include a particle source positioned to direct charged particles into a target material proximate to the annular solution vessel for generation of neutrons from the target material to be received in the annular reaction container; and the target material may be contained within a target chamber centered within the central opening and receiving particles along the axis.

It is thus a feature of at least one embodiment of the invention to provide a target that may be wholly contained within the fissile solution vessel and that will readily produce neutrons passing into the annular fissile solution vessel after excitation by ions generated externally.

The medical isotope generator may include a neutron multiplier and or moderator material positioned between the target chamber and the inner wall.

It is thus a feature of at least one embodiment of the invention to convert excess neutron energy obtainable with the ion collision mechanism into additional neutrons. It is another feature of at least one embodiment of the invention to provide for moderation of neutron speeds through a collisional process and thus better control the reaction rate within the annular chamber.

The medical isotope generator may further include a reflecting material concentrically outside of the annular solution vessel.

It is thus a feature of at least one embodiment of the invention to permit placement of a reflector outside of the annular fissile solution vessel at a location that allows an arbitrary thickness of material to be employed.

The aspect ratio defined by a radial thickness of the annular solution vessel perpendicular to the axis to a height of the annular solution vessel along the axis may be substantially greater than 0.1 or between 0.1 and 0.3 or between 0.12 and 0.25.

It is thus a feature of at least one embodiment of the invention to provide dimensions to the annular chamber realizing an improvement over a cylindrical chamber or other aspect ratio annular chambers.

The nuclear material may be low enriched uranium having a concentration between 10 and 450 grams of low enriched uranium per liter solution.

It is thus an object of the invention to provide a reaction system that may work with low concentrations of nuclear materials.

These particular objects and advantages may apply to only some embodiments falling within the claims and thus do not define the scope of the invention.

BRIEF DESCRIPTION OF THE DRAWINGS

FIG. 4 is a perspective view in cutaway aligned over a top plan cross-section of yet another alternative embodiment employing a hexagonal annulus and isolated aqueous parent material; and FIG. 5 is a top plan cross-section of an alternative embodiment of the invention using a separated neutron multiplier and neutron moderator;

DETAILED DESCRIPTION OF THE PREFERRED EMBODIMENT

Figure 1:
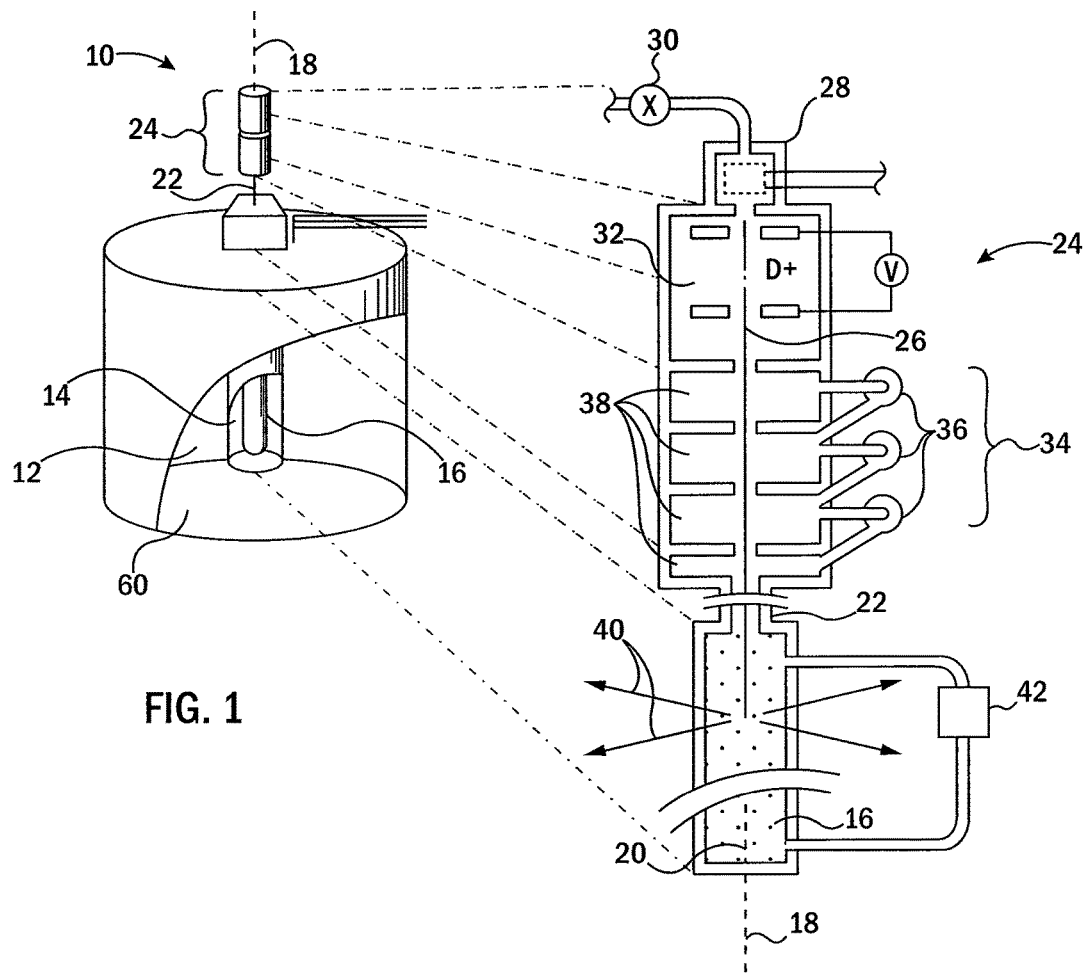
FIG. 1 is a perspective view in partial cutaway of one embodiment of the present invention showing concentric chambers including an annular fissile solution vessel assembly around a central cylindrical target chamber, the latter receiving ions along an axis of the cylinder and annulus.

Referring now to FIG. 1, a medical isotope generator 10 of the present invention may provide a set of nested annular elements including an outer annular reflector chamber 12 surrounding and coaxial with an annular reactor assembly 14. A cylindrical target chamber 16 fits within the annular reactor assembly 14 so that all three elements of the annular reflector chamber 12, annular reactor assembly 14, and target chamber 16 share a common central axis 18.

The outer annular reflector chamber 12 may be taller than the annular reactor assembly 14 to provide a substantially equal thickness of reflecting material around the annular reactor assembly 14 in a direction perpendicular to central axis 18, and above and beneath the annular reactor assembly 14 in directions along central axis 18. In this embodiment, the annular reactor assembly 14 may be substantially equal in height to the target chamber 16.

The target chamber 16 may be a vertically oriented cylindrical shell extending along axis 18 and defining a cylindrical volume that will be charged with a target gas 20, for example tritium. The cylindrical volume of the target chamber 16 communicates through a vertically extending conduit 22 upward through the outer annular reflector chamber 12 to an ion injector 24 positioned above the target chamber 16 and outside of the outer annular reflector chamber 12.

The ion injector 24 is positioned to direct a beam of ions 26, for example deuterium ($D^+$), vertically along axis 18 through the conduit 22 into the target chamber 16. The height of the target chamber 16 along axis 18 and the pressure of the target gas 20 are adjusted to ensure substantially complete collision of the ions with the tritium in the target chamber 16. In one embodiment the target gas 20 may have a pressure of approximately 10 Torr and having a height within the target chamber 16 along axis 18 of approximately 1 meter.

The ion injector 24 incorporates an ion source 28 which, in one embodiment, is a cavity receiving deuterium gas through valve 30 to be ionized, for example, by microwave emissions, ion impact ionization, or laser ionization. A generated beam of ions 26 (for example at a rate of approximately 50 milliamperes) passes into an accelerator 32 accelerating the ion beam along the axis 18. The accelerator, for example, may be an electrostatic accelerator providing 300 kilovolts of acceleration of the ions.

The beam of ions 26 then passes through a set of baffle chambers 38 bridged by differential pumps 34. The differential pumps 34 operate to preserve a low-pressure of approximately 50 micro-Torr in the accelerator 32 while permitting the higher 10 Torr pressure in the target chamber 16. In one embodiment this system employees three pumps 36 each drawing gas from a higher baffle chamber 38 (toward the accelerator 32) and pumping it to a lower baffle chamber 38 (toward the target chamber 16). The baffle chambers 38 communicate through relatively small openings along axis 18, for example one centimeter in diameter, to allow passage of the beam of ions 26 while reducing leakage of the tritium in the target chamber 16

The gas streams through the pumps 36 may be cooled by a moderator fed by chilled water (not shown). The upper pumps may, for example, be turbo pumps operating at less than $5 \times 10^{-5}$ Torr and 5-10 milliTorr respectively, for example, commercially available from Varian, Inc. having offices in Lexington, Mass. The lower pump may be a roots blower, for example, of a type commercially available from Leybold Vacuum Products Inc. having offices in Export, Pennsylvania. Cold traps, getter traps and palladium leaks may be used to remove atmospheric and/or hydrocarbon contaminants from the pump gases.

The beam of ions 26 strikes target gas 20 in the target chamber 16 to produce neutrons 40 that pass radially and axially outward from the target chamber 16, for example, with deuterium ($D^+$) striking the tritium to produce $^4$He and a 14.1 MeV neutron. This reaction is predicted to produce approximately $5 \times 10^{13}$ neutrons per second for a 50 milliampere beam of ions 26.

Contamination of the target gas 20 by the ions of the beam of ions 26 and helium may be reduced by a purification system 42 such as the Thermal Cycling Absorption Process (TCAP) system developed by the Savanna River National Laboratory (SRNL).

In an alternate embodiment, the ions may be replaced by electrons and the target chamber may contain a bremsstrahlung converter and photonuclear material such as uranium from which neutrons are produced.

Figure 2:
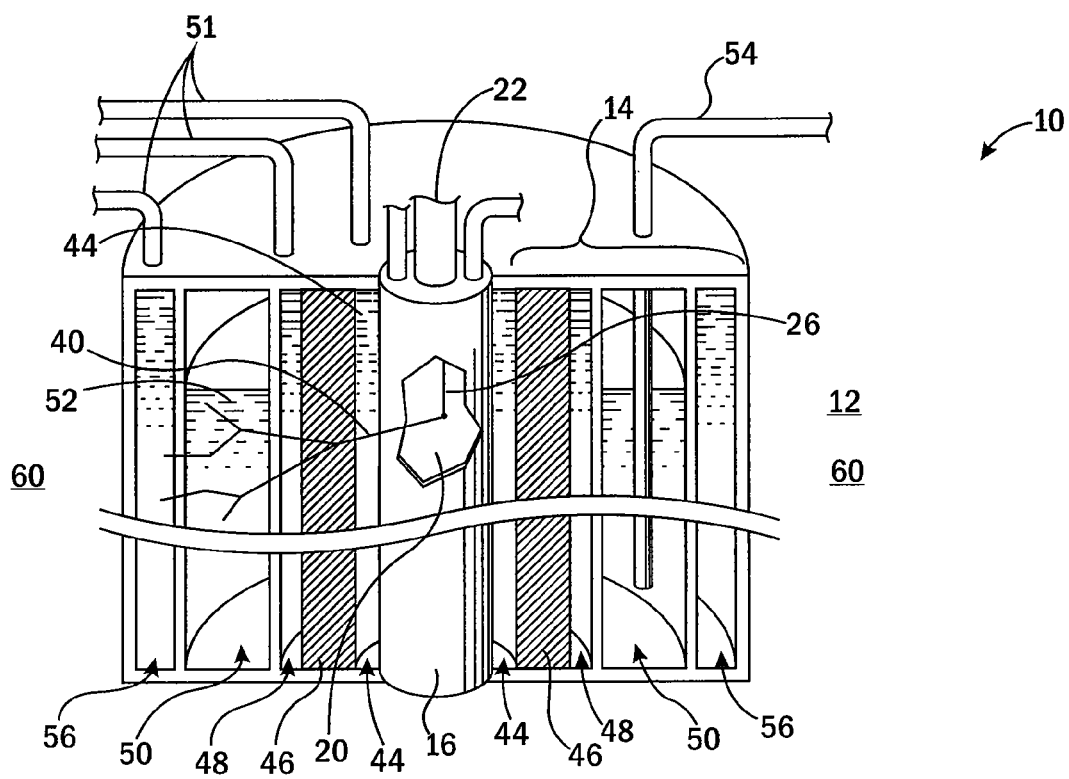
FIG. 2 is a cross-sectional view of the annular fissile solution vessel assembly including an inner neutron multiplier surrounded by an annular fissile solution vessel, the latter flanked by water cooling jackets.

Referring now to FIG. 2, the beam of neutrons 40 from the target chamber 16 may pass into the annular reactor assembly 14. The annular reactor assembly 14 includes an initial one-centimeter thick (in a radial direction) annular water jacket 44 receiving circulated chilled light water provided through one or more conduits 51 from an external water chiller, recycler. The annular water jacket 44 is followed by a coaxial annular neutron multiplier/moderator 46, the latter being in one embodiment an aluminum-clad beryllium metal that multiplies fast neutrons passing outward from the target chamber 16 and moderates fast neutrons traveling inward from the annular fissile solution vessel 50 (to be described) by "cooling" those neutrons, a process that reduces their speed in exchange for an increasing of the temperature of the neutron multiplier/moderator 46. The excess heat of the neutron multiplier/moderator 46 is removed by water jackets 48 and 44 which allow control the temperature of the neutron multiplier/moderator 46 to ensure the escape of sufficient neutrons from the target chamber 16 while moderating neutrons received from the annular fissile solution vessel 50. Alternatively, the neutron multiplier/moderator 46 may be constructed of depleted uranium or other similar material. The neutron multiplier/moderator 46 may provide 1.5-3.0 multiplication factor such as may be adjusted by adjusting its thickness.

Neutrons emerging from the neutron multiplier/moderator 46 pass through a second annular chilled water jacket 48 similar to water jacket 44 and then into annular fissile solution vessel 50, the latter having walls comprised, in one embodiment, of zircaloy-4. The annular fissile solution vessel 50 includes a solution 52 of a parent material such as Uranyl Nitrate or Uranyl Sulfate in a light water solution. The solution 52 contains nominally 19.75 percent $^{235}$U and thus is low enriched uranium (LEU).

Production of the desired $^{99}$Mo isotope occurs by fission of $^{235}$U in the solution 52 which also produces additional neutrons.

Solution 52 may be extracted from the annular fissile solution vessel 50 via one or more conduits 54 where the desired isotopes may be chemically extracted from the fissile solution. These isotopes may be purified via the LEU-modified Cintichem process to provide a source of the desired medical isotopes, particularly $^{99}$Mo. The fissile solution may be cleaned using the UREX process to extend the useable lifetime of the solution. Access conduits 54 also allow control of the height of the solution 52 for control of the reaction as well as initial filling, subsequent drainage, and flushing of the annular fissile solution vessel 50. The access conduits 54 also allow introduction and removal of nitrogen for space filling and for feed makeup for water, fissile solution, and pH control (when using uranyl nitrate).

Concentrically surrounding the annular fissile solution vessel 50 is another water jacket 56 similar to water jackets 48 and 44 having chilled light water circulating therein.

Outside of the annular reactor assembly 14 is the annular reflector chamber 12, for example being an aluminum walled chamber filled with a reflector material 60 which in one embodiment may be heavy water having a volume, for example, of 1000 liters. The reflector material 60 increases the generation efficiency by reflecting neutrons back into the annular fissile solution vessel 50 and therefore may also permit reaction control by draining the annular reflector chamber 12 and thus reducing the neutron reflection into the annular fissile solution vessel 50. Control of the reaction rate may also be had by changing the height of solution 52 in the annular fissile solution vessel 50.

Figure 6:
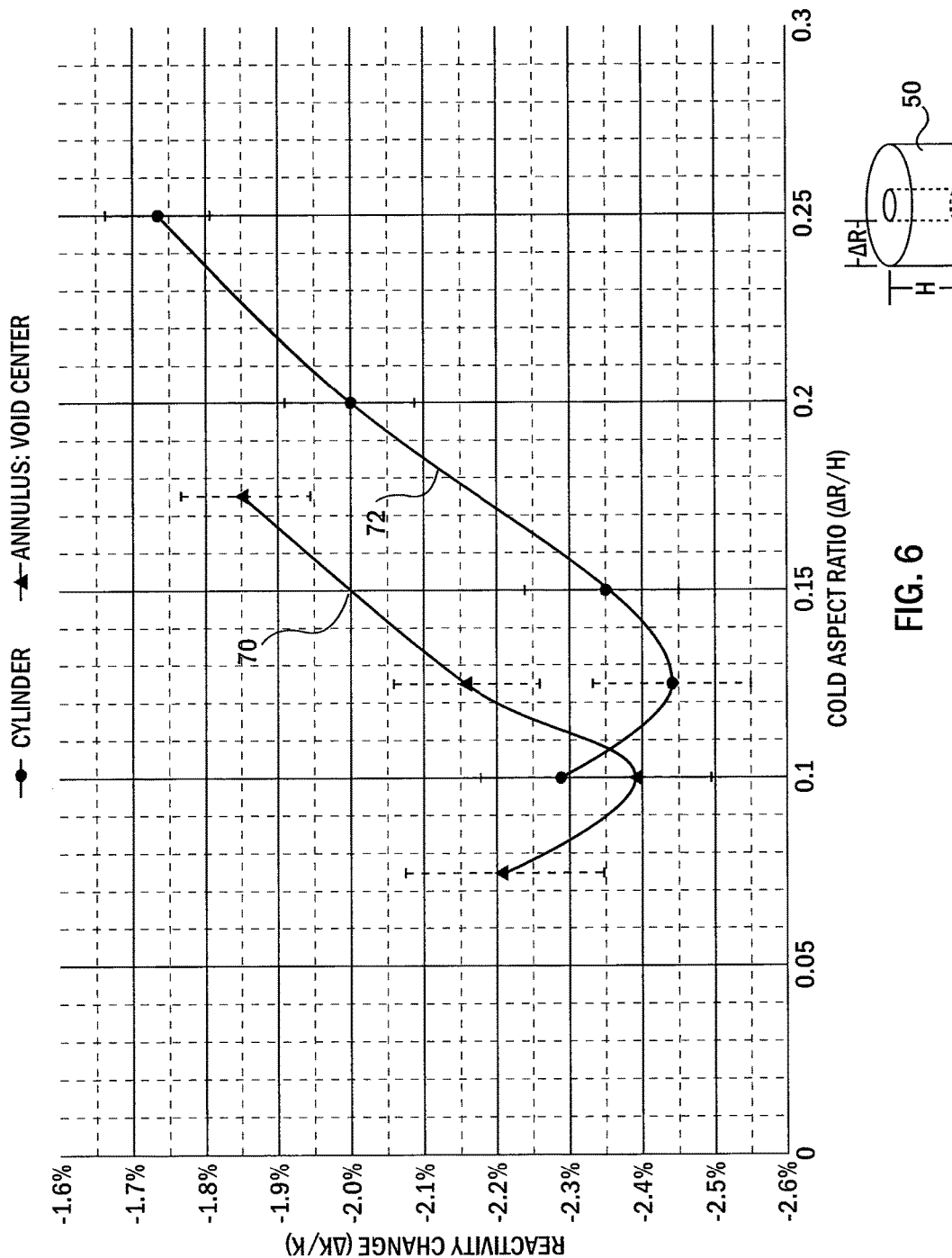
FIG. 6 is a plot of reactivity change versus aspect ratio of the annular fission solution vessel of FIG. 2 showing a region of improved stability for the annular fission solution vessel over a cylindrical fission solution vessel.

Referring now to FIGS. 2 and 6, during operation, thermal energy generated by the fission reactions causes solution 52 to rise in temperature, for example, from 20 degree Celsius to 60 degrees Celsius and can promote the generation of voids formed by radiolysis of hydrogen or oxygen or from other gases such as ammonia and $NO_x$ (in the case of use of uranyl nitrate) as well as krypton and xenon produced by fission. Generally, these gases are diluted by nitrogen fill and drawn off for processing.

The increase in temperature and the formation of voids can significantly reduce the neutron multiplication factor $k_{\it eff}$ in the chamber 50. This effect, however, is reduced by the annular form of the annular fissile solution vessel 50 as compared to cylindrical chamber of similar volume.

As shown generally in FIG. 6, a calculated reactivity curve 70 as a function of aspect ratio for the annular chamber 50 shows a lower magnitude reactivity change (values closer to zero in the chart) for the annular volume 50 then a comparable reactivity curve 72 for a cylindrical volume at aspect ratios above approximately 0.11. Lower magnitude of reactivity change equates to a desirable improved stability of the reaction system.

The aspect ratio is the radial thickness of the volume 50 divided by the height of the volume 50. Reactivity change is change in neutron multiplication factor k (i.e., Δk) divided by k. Generally it will be therefore desirable that the volume 50 have an aspect ratio of between 0.1 and 0.3 and alternatively between 0.12 and 0.25 or substantially greater than 0.15.

Figure 7:
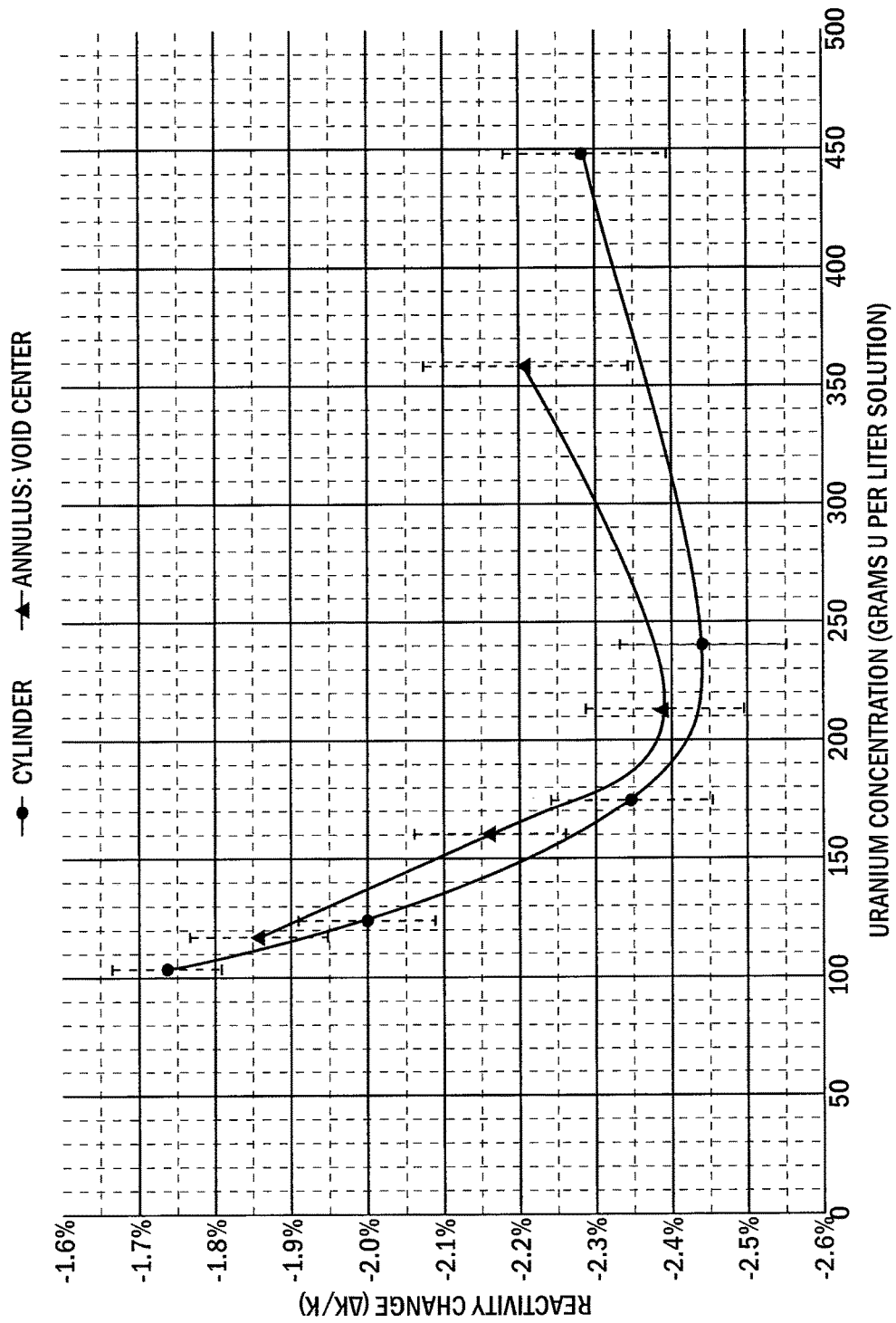
FIG. 7 is a plot of reactivity change versus low enriched uranium concentration for an annular and a cylindrical fission solution vessel.

Referring now to FIG. 7, a calculated reactivity curve as a function of concentration of low enriched uranium shows an improved stability within the range of 102-450 grams of low enriched uranium per liter of solution when compared to a cylindrical chamber, finding acceptable operating concentration within this range. It is believed that this data can be extrapolated to indicate an acceptable operating range from 10-450 grams of low enriched uranium per liter of solution.

Figure 3:
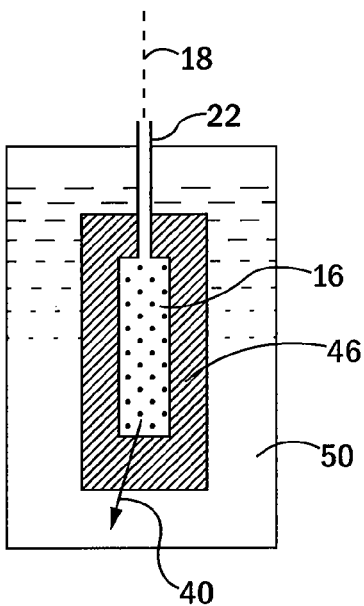
FIG. 3 is a simplified elevational cross-section of an alternative embodiment of the invention in which the annular reaction assembly includes sections that cover the top and bottom of the target chamber as well as the sides.

Referring now to FIG. 3, the top and bottom of the target chamber 16 also may be surrounded by the neutron multiplier/moderator 46 and portions of the annular chamber 50 for improved efficiency in capturing neutrons 40. It will thereby be understood that the term annular should be understood to include an annulus having an upper and lower solid base.

Referring now to FIG. 4, it will further be appreciated that the annular chamber 50 need not be a cylindrical annulus but may take on other annular shapes such as a polygonal annulus 80 having an inner and outer periphery providing a polygonal cross-sectional such as a hexagon. Further, the solution 52 within the annular fissile solution vessel 50 need not be homogenously distributed, but may be, for example, contained within separate reactant columns 84, for example, passing in a serpentine path through the water bath of the annular fissile solution vessel 50. Such reactants columns can further provide reduced thermal resistance and moderate the effect of voids.

Referring now to FIG. 5, the neutron multiplier/moderator 46 of FIG. 2 may desirably be split into two components, the first being primarily a neutron moderator 92, for example, constructed of beryllium or the like as described above, and positioned coaxially inside the water jacket 48 and coaxially outside the water jacket 44 both previously described. In this embodiment, a separate neutron multiplier 90 may be positioned coaxially within the water jacket 44, constructed, for example, of and cooled both by its contact with water jacket 44 coaxially surrounding the neutron multiplier 90 and a water jacket 94 coaxially within the neutron multiplier 90 and surrounding the target chamber 16. The separation of functions allows independent temperature control of the neutron moderator 92 and the neutron multiplier 90 as well as constructing these components of different materials (if desired) and tailoring their thicknesses to the particular roles they play.

The temperature of the water jacket 44 and 94 may be monitored by temperature probes 96 and 98 and provided to a feedback control system 100 controlling intake valves 102 and 104 for the water jackets 44 and 94 respectively (outlet valves not shown). The valves 102 and 104 may control the circulation of chilled water within the water jackets 44 and 94 thereby controlling the temperature of the neutron moderator 92 and its effect in moderating the nuclear reaction. The feedback controller 100 may control the temperature of the water jackets 44 and 94 to a predetermined value or to a dynamic value based on a monitoring of the general reaction rate by other means. In addition the feedback controller 100 may manage other control variables such as control of height of the solution 52 to moderate the reaction rate.

Generally, the medical isotope generator 10 will be further shielded with concrete and water according to standard practices. Other isotopes such as $^{131}$I, $^{133}$Xe, and $^{111}$In may also be produced by a similar structure.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A nuclear reaction system comprising:
   an annular solution vessel having an inner wall defining an inner circumference and an opposed outer wall defining an outer circumference, the inner wall and outer wall defining a first volume therebetween and a second volume within the inner wall, both walls extending along a shared central axis;
   an aqueous fissile solution within the first volume;
   a first annular cooling jacket containing cooling fluid in thermal communication with the aqueous fissile solution through an inner intermediate wall, the first annular cooling jacket defined by the inner wall of the annular solution vessel and the inner intermediate wall;
   a second annular cooling jacket containing cooling fluid in thermal communication with the aqueous fissile solution through an outer intermediate wall, the second annular cooling jacket defined by the outer wall of the annular solution vessel and the outer intermediate wall;
   a particle emitter positioned within the second volume and configured to emit neutrons passing radially outward from the volume through the first annular cooling jacket to the aqueous fissile solution; and
   a neutron multiplier disposed within the first annular cooling jacket between the inner wall of the annular solution vessel and the inner intermediate wall and configured to absorb the neutrons from the particle emitter and provide more neutrons than it absorbs to the aqueous fissile solution, wherein the neutron multiplier material is selected from the group consisting of beryllium and depleted uranium and natural uranium.

2. The nuclear reaction system of claim 1 wherein the annular solution vessel contains low enriched uranium.

3. The nuclear reaction system of claim 2 wherein the annular solution vessel contains a mixture of water and at least one of uranyl nitrate, uranyl sulfate, uranyl fluoride or uranyl phosphate.

4. The nuclear reaction system of claim 1 further including a particle source positioned to direct charged particles into the particle emitter proximate to the annular solution vessel for generation of neutrons from the particle emitter to be received in the annular solution vessel.

5. The nuclear reaction system of claim 1 wherein the neutron multiplier material provides for a neutron multiplication of substantially 1.5-3.0.

6. The nuclear reaction system of claim 5 further including a neutron moderator material positioned between the inner wall of the annular solution vessel and the inner intermediate wall in coaxial separation from the neutron multiplier.

7. The nuclear reaction system of claim 1 further including a reflecting material concentrically outside of the annular solution vessel.

8. The nuclear reaction system of claim 1 wherein the cooling fluid delivered to the first and second annular jackets is chilled water.

9. The nuclear reaction system of claim 1 wherein the particle emitter is a target material receiving a charged particle from a particle source.

10. The nuclear reaction system of claim 1 further comprising a feedback control system comprising temperature probes in thermal communication with at least one of the water jackets and a valve in fluid communication with the aqueous fissile solution, the feedback control system configured to actuate the valve and adjust a level of the aqueous fissile solution within the first volume based on a temperature sensed by the temperature probes.

11. A nuclear reaction system comprising:
an annular solution vessel having an inner wall defining an inner circumference and an opposed outer wall defining an outer circumference, the inner wall and outer wall defining a first volume therebetween and a second volume within the inner wall, both walls extending along a shared central axis;
an aqueous fissile solution within the first volume;
a first annular cooling jacket containing cooling fluid in thermal communication with the aqueous fissile solution through an inner intermediate wall, the first annular cooling jacket defined by the inner wall of the annular solution vessel and the inner intermediate wall;
a second annular cooling jacket containing cooling fluid in thermal communication with the aqueous fissile solution through an outer intermediate wall, the second annular cooling jacket defined by the outer wall of the annular vessel and the outer intermediate wall;
a particle emitter positioned within second volume and configured to emit neutrons passing radially outward from the volume through the first annular cooling jacket to the aqueous fissile solution; and
a feedback control system comprising temperature probes in thermal communication with at least one of the water jackets and a valve in fluid communication with the aqueous fissile solution, the feedback control system configured to actuate the valve and adjust a level of the aqueous fissile solution within the first volume based on a temperature sensed by the temperature probes.

12. The nuclear reaction system of claim 11 wherein the annular solution vessel contains low enriched uranium.

13. The nuclear reaction system of claim 12 wherein the annular solution vessel contains a mixture of water and at least one of uranyl nitrate, uranyl sulfate, uranyl fluoride or uranyl phosphate.

14. The nuclear reaction system of claim 11 further including a particle source positioned to direct charged particles into the particle emitter proximate to the annular solution vessel for generation of neutrons from the particle emitter to be received in the annular solution vessel.

15. The nuclear reaction system of claim 11 further comprising a neutron multiplier disposed within the first annular cooling jacket between the inner wall of the annular solution vessel and the inner intermediate wall and configured to absorb the neutrons from the particle emitter and provide more neutrons than it absorbs to the aqueous fissile solution, wherein the neutron multiplier material is selected from the group consisting of beryllium and depleted uranium and natural uranium.

16. The nuclear reaction system of claim 15 wherein the neutron multiplier material provides for a neutron multiplication of substantially 1.5-3.0.

17. The nuclear reaction system of claim 16 further including a neutron moderator material positioned between the inner wall of the annular solution vessel and the inner intermediate wall in coaxial separation from the neutron multiplier.

18. The nuclear reaction system of claim 11 further including a reflecting material concentrically outside of the annular solution vessel.

19. The nuclear reaction system of claim 11 wherein the cooling fluid delivered to the first and second annular jackets is chilled water.

20. The nuclear reaction system of claim 11 wherein the particle emitter is a target material receiving a charged particle from a particle source.

* * * * *

UNITED STATES PATENT AND TRADEMARK OFFICE
CERTIFICATE OF CORRECTION

PATENT NO.        : 10,332,646 B2
APPLICATION NO.   : 13/373899
DATED             : June 25, 2019
INVENTOR(S)       : Piefer et al.

Page 1 of 1

It is certified that error appears in the above-identified patent and that said Letters Patent is hereby corrected as shown below:

On the Title Page

The Assignee should read as follows:
Assignee:     Wisconsin Alumni Research Foundation, Madison, WI (US);
              SHINE Medical Technologies, Inc., Janesville, WI (US)

Signed and Sealed this
Twentieth Day of August, 2019

Andrei Iancu
*Director of the United States Patent and Trademark Office*